United States Patent [19]

Jahnke

[11] 4,061,580

[45] Dec. 6, 1977

[54] THICKENED AQUEOUS COMPOSITIONS FOR WELL TREATMENT

[75] Inventor: Richard William Jahnke, Mentor-on-the-Lake, Ohio

[73] Assignee: The Lubrizol Corporation, Cleveland, Ohio

[21] Appl. No.: 721,638

[22] Filed: Sept. 8, 1976

[51] Int. Cl.$^2$ .................. E21B 43/27; E21B 43/26
[52] U.S. Cl. .................. 252/8.55 R; 252/8.55 C; 252/316; 252/389 A; 252/390
[58] Field of Search ............ 252/8.55 C, 8.55 R, 252/8.55 D, 311, 316

[56] References Cited

U.S. PATENT DOCUMENTS

| | | | |
|---|---|---|---|
| 2,510,063 | 6/1950 | Bried | 252/392 X |
| 2,596,137 | 5/1952 | Fast | 252/8.55 X |
| 2,763,326 | 9/1956 | Cardwell et al. | 252/8.55 X |
| 2,799,659 | 7/1957 | Mayhew et al. | 252/8.55 X |
| 3,042,610 | 7/1962 | Dunlap | 252/8.55 |
| 3,147,806 | 9/1964 | Reed et al. | 252/8.55 X |
| 3,373,107 | 3/1968 | Rice et al. | 252/8.55 |
| 3,781,203 | 12/1973 | Clark | 252/8.55 |

OTHER PUBLICATIONS

Ethomeens, Ethomids, Ethofats, Publication by Armour Chemical Division, Armour and Company, Chicago 9, Ill., 1949, pp. 1, 2, 3, 5, 8, 18, 19, 23 and 26.

*Primary Examiner*—Herbert B. Guynn
*Attorney, Agent, or Firm*—James W. Adams, Jr.; William H. Pittman

[57] ABSTRACT

Thickened fracturing and acidizing fluids suitable for well treatment are prepared by adding certain amine salts to aqueous acid or salt solutions. The amines from which the amine salts are prepared are alkoxylated alkyl- or alkenylamines in which an alkyl or alkenyl group contains at least about 14 and preferably about 14–30 carbon atoms. Most often the alkyl or alkenyl group is oleyl, stearyl, or a mixture of groups derived from such fats as tallow or soybean oil. The especially preferred amines are the "Ethomeens" which are ethoxylated fatty amines.

10 Claims, No Drawings

THICKENED AQUEOUS COMPOSITIONS FOR WELL TREATMENT

This invention relates to new thickened compositions of matter useful as well treatment fluids, and to methods for their use. More particularly, it relates to thickened compositions comprising a major amount of an aqueous solution of an acid or salt and a minor amount of a salt of at least one alkoxylated alkyl- or alkenylamine in which at least one alkyl or alkenyl radical attached directly to nitrogen contains at least about 14 carbon atoms.

In an oil well fracturing operation, an aqueous fluid, typically a salt solution such as brine or a solution of mixed sodium and calcium chlorides, is forced down a well bore, usually under high pressure, to fracture the rock formation surrounding the well bore. The pressure is then relieved, allowing the oil to seep through the fractures into the well bore where it is pumped to the surface. Frequently a "propping agent", whose function is to prevent the fractures from closing by propping them apart, is incorporated in the fracturing fluid. Propping agents in use include ground coconut shells, polystyrene beads, and glass balls, but the most common propping agent is sand.

Difficulties are often encountered in keeping the propping agent dispersed in the fracturing fluid so that it is carried into the fractures and does not merely settle in the lower portions of the exterior pipes and in the well. This problem is often solved by adding a thickening or gelling agent to the fracturing fluid in order to increase its viscosity; the thickened or gelled fluid is then capable of suspending the propping agent. A good thickening agent should yield a high viscosity at a low concentration and be relatively inexpensive.

An alternative method of well treatment, especially useful with carbonate-based rock that is too hard or brittle to be satisfactorily fractured, is to force an aqueous solution of an acid down the well bore to chemically etch the rock so as to permit the oil to flow into the well. Thickening or gelling agents are frequently used in acidizing solutions to moderate the rate of reaction of the acid with the rock, thereby improving uniformity and penetration. In addition to the aforementioned properties, thickeners for use in acidizing fluids must be stable to hydrolysis by the acid used and should have corrosion inhibiting properties to avoid pickling of steel tools and other equipment in the well.

A principal object of the present invention, therefore, is to provide improved thickened compositions for use in well treatment for fracturing and acidizing.

A further object is to provide thickened aqueous well treatment fluids containing acids or salts, which have relatively stable viscosity during well treatment operations and which simultaneously act as corrosion inhibitors.

A still further object is to provide improved fracturing and acidizing methods for wells.

Other objects will in part be obvious and will in part appear hereinafter.

The above objects are fulfilled according to this invention by using as a thickening agent a salt of at least one alkoxylated alkyl- or alkenylamine as defined hereinafter. (As used herein, the term "thickening" denotes increasing the viscosity of a liquid. It includes gelling and many of the thickened compositions of this invention are gels.) The anionic portion of the salt may be derived from any commercially available acid such as hydrochloric, sulfuric, nitric, phosphoric, acetic, formic, propionic and the like, but is preferably derived from a mineral acid such as hydrochloric, sulfuric, phosphoric or nitric, with phosphoric acid being preferred because its salts are particularly easy to handle by virtue of their relatively low viscosity.

The alkoxylated amine is preferably a monoamine. It may be defined by the formula $R_3N$, wherein the R groups are defined as follows:
  One or two such R groups are alkyl or alkenyl radicals, at least one such alkyl or alkenyl radical containing at least about 14 and preferably about 14–30 carbon atoms.
  At least one such R group is a hydroxyalkyl or hydroxyalkylpoly-(oxyalkylene) radical in which the alkyl group contains about 2–6 carbon atoms.
  Any remaining R groups are hydrogen.

The especially preferred amines are those having the formula

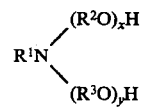

wherein $R^1$ is an alkyl or alkenyl radical having about 14–30 carbon atoms, each of $R^2$ and $R^3$ is a vicinal alkylene radical, and each of $x$ and $y$ is an integer and is at least 1, the total of $x$ and $y$ being 6 or less. Thus, $R^1$ may be a tetradecyl, pentadecyl, hexadecyl, octadecyl, eicosyl, tetradecenyl or octadecenyl radical or the like. Mixtures of amines containing different $R^1$ groups are useful, as described hereinafter.

Each of $R^2$ and $R^3$ is a vicinal alkylene radical. The term "vicinal" means that the free valence bonds of the radical (attached to oxygen and/or nitrogen) are on adjacent carbon atoms. Most often, $R^2$ and $R^3$ are identical and they are perferably ethylene radicals; the total of $x$ and $y$ is 4 or less, especially 2; and $R^1$ is at least one fatty alkyl or alkenyl radical. By "fatty alkyl or alkenyl" is meant an alkyl or alkenyl radical which may be derived from a natural fat or oil, or from a derivative thereof such as the corresponding nitrile, by hydrogenation of the ester or nitrile group. Thus, examples of fatty alkyl and alkenyl groups are the myristyl (tetradecyl), palmityl (hexadecyl), stearyl (octadecyl) and oleyl (9-octadecenyl) groups.

The especially preferred amines for the preparation of the thickened compositions of this invention are certain of the "Ethomeens", a series of commercial mixtures of alkoxylated fatty amines available from Armak Company. Suitable "Ethomeens" include "Ethomeen O/12", "Ethomeen S/12", "Ethomeen T/12" and "Ethomeen 18/12". In these compounds $R^2$ and $R^3$ are ethylene radicals, each of $x$ and $y$ is 1, and $R^1$ is respectively oleyl, a mixture of alkyl and alkenyl groups derived from soybean oil, a mixture of alkyl and alkenyl groups derived from tallow, and stearyl. As will be apparent from a consideration of the fats and oils from which these amines are derived, $R^1$ is in each instance a radical containing at least about 14 carbon atoms. The especially preferred "Ethomeen" is "Ethomeen O/12".

The amine salts used as thickeners according to this invention may be prepared by merely blending the amine and the desired acid in aqueous solution, typically at a temperature between ambient temperature and about 100° C. and preferably about 25°–70° C. The amount of water present in the aqueous solution may be varied according to the viscosity of the salt solution obtained; naturally, a more dilute solution will be less viscous and thus frequently easier to handle than a more concentrated solution. The ratio of amine and acid may be varied according to the salt desired. Thus, salts may be prepared containing one equivalent of amine per equivalent of acid or, in the case of polybasic acids such as sulfuric and phosphoric acids, as little as one-half equivalent of amine per equivalent of acid may be used resulting in the formation of an acidic salt.

Following preparation of the aqueous salt solution, said solution may be concentrated (e.g., by evaporation) or diluted to the desired viscosity. Typically, the solution contains about 40–70% by weight of the amine salt.

The aqueous acid or salt solutions which may be thickened by the addition of the above-described amine salts are well known to those skilled in the art as being useful for acidizing wells or fracturing rock formations in connection with petroleum production and the like. A typical acidizing solution is a 15% aqueous solution of a mineral acid, especially hydrochloric acid. Such solution may be gelled by the addition of a minor amount, usually about 3–10% by weight and typically about 5%, of an amine or amine salt as described herein. If the free amine is added, it naturally forms a salt upon contact with the acid in the solution. Alternatively, a salt such as the phosphate salt, typically produced by the reaction of equimolar quantities of the amine and phosphoric acid, may be used as a gellant for the acid.

Fracturing fluids comprising aqueous salt solutions are also well known to those skilled in the art; a typical one contains 4% by weight sodium chloride and 1% calcium chloride. Such solutions may also be gelled by the addition of about 3–10% by weight, preferably about 5%, of an amine salt as described herein. Illustrative salts are those formed by the reaction of equimolar amounts of "Ethomeen O/12", "Ethomeen T/12" or "Ethomeen S/12" with phosphoric acid, hydrochloric acid, sulfuric acid, nitric acid or acetic acid.

The thickened compositions of this invention maintain their viscosity over prolonged periods, a property required in well treatment fluids. Moreover, they serve as inhibitors of pickling of steel tools and equipment used in the well.

What is claimed is:

1. A thickened composition comprising a major amount of hydrochloric aqueous solution of an acid or a salt useful in well treatment and a minor thickening amount of a phosphate salt of at least one alkoxylated amine of the formula

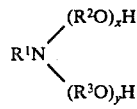

wherein $R^1$ is an alkyl or alkenyl radical having about 14–30 carbon atoms, each of $R^2$ and $R^3$ is an ethylene radical, and each of $x$ and $y$ is an integer of at least 1, the total of $x$ and $y$ being 6 or less.

2. A composition according to claim 1 wherein $R^1$ is at least one fatty alkyl or alkenyl radical, and the total of $x$ and $y$ is 4 or less.

3. A composition according to claim 2 wherein $R^1$ is the oleyl radical and each of $x$ and $y$ is 1.

4. In a well fracturing method which comprises forcing an aqueous salt solution down the bore of an oil well under sufficient pressure to fracture the rock formations surrounding said well bore, the improvement which comprises thickening said salt solution by incorporating therein a minor amount of a phosphate salt of at least one alkoxylated amine of the formula

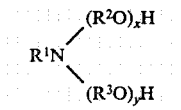

wherein $R^1$ is an alkyl or alkenyl radical having about 14–30 carbon atoms, each of $R^2$ and $R^3$ is an ethylene radical, and each of $x$ and $y$ is an integer of at least 1, the total of $x$ and $y$ being 6 or less.

5. A method according to claim 4 wherein $R^1$ is at least one fatty alkyl or alkenyl radical, and the total of $x$ and $y$ is 4 or less.

6. A method according to claim 5 wherein the salt solution is a solution of sodium chloride and calcium chloride.

7. A method according to claim 6 wherein $R^1$ is the oleyl radical and each of $x$ and $y$ is 1.

8. In a well acidizing method which comprises forcing hydrochloric aqueous solution of an acid down the bore of an oil well, thus chemically etching the rock formations surrounding said well bore so as to permit oil to flow into the well, the improvement which comprises thickening said acid solution by incorporating therein a minor amount of a phosphate salt of at least one alkoxylated amine of the formula

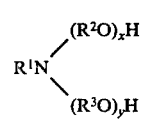

wherein $R^1$ is an alkyl or alkenyl radical having about 14–30 carbon atoms, each of $R^2$ and $R^3$ is an ethylene radical, and each of $x$ and $y$ is an integer of at least 1, the total of $x$ and $y$ being 6 or less.

9. A method according to claim 8 wherein $R^1$ is at least one fatty alkyl or alkenyl radical, and the total of $x$ and $y$ is 4 or less.

10. A method according to claim 9 wherein $R^1$ is the oleyl radical and each of $x$ and $y$ is 1.

* * * * *

UNITED STATES PATENT AND TRADEMARK OFFICE
CERTIFICATE OF CORRECTION

PATENT NO. : 4,061,580
DATED : December 6, 1977
INVENTOR(S) : Richard William Jahnke It is certified that error appears in the above—identified patent and that said Letters Patent are hereby corrected as shown below:

Column 3, line 49 (that is, line 2 of claim 1), should read --amount of an aqueous solution of hydrochloric acid or--. Column 4, line 36 (that is, line 2 of claim 8) should read --ing an aqueous solution of hydrochloric acid down the--.

Signed and Sealed this

Sixth Day of June 1978

[SEAL]

*Attest:*

RUTH C. MASON
*Attesting Officer*

DONALD W. BANNER
*Commissioner of Patents and Trademarks*